United States Patent [19]

Rogstadius

[11] Patent Number: 4,519,672

[45] Date of Patent: May 28, 1985

[54] METHOD FOR OBTAINING AN ACCURATE CONCENTRIC FASTENING OF AN OPTICAL FIBRE IN A CONNECTOR

[76] Inventor: Ivan Rogstadius, Sidensvasvägen 6, S-125 31 Älvsjö, Sweden

[21] Appl. No.: 380,870
[22] PCT Filed: Sep. 17, 1981
[86] PCT No.: PCT/SE81/00270
 § 371 Date: May 10, 1982
 § 102(e) Date: May 10, 1982
[87] PCT Pub. No.: WO82/01077
 PCT Pub. Date: Apr. 1, 1982

[30] Foreign Application Priority Data

Sep. 17, 1980 [SE] Sweden ............................... 8006532

[51] Int. Cl.³ ........................... G02B 5/14; G02B 7/26
[52] U.S. Cl. .............................. 350/96.20; 350/96.10; 350/96.21
[58] Field of Search ............... 350/96.10, 96.20, 96.21, 350/96.22

[56] References Cited

U.S. PATENT DOCUMENTS

| | | | |
|---|---|---|---|
| 4,080,044 | 3/1978 | Gousseau | 350/96.21 |
| 4,116,655 | 9/1978 | Lewis | 350/96.22 |
| 4,133,601 | 1/1979 | Le Guen et al. | 350/96.21 |
| 4,168,109 | 9/1979 | Dunmire | 350/96.22 |
| 4,190,317 | 2/1980 | Makuch | 350/96.20 |
| 4,205,896 | 6/1980 | Borsuk | 350/96.21 |
| 4,383,736 | 5/1983 | Forman | 350/96.21 |
| 4,444,458 | 4/1984 | Stowe et al. | 350/96.15 |

FOREIGN PATENT DOCUMENTS 1478135 6/1977 United Kingdom ............. 350/96.21

Primary Examiner—William L. Sikes
Assistant Examiner—Brian M. Healy
Attorney, Agent, or Firm—Pollock, Vande Sande and Priddy

[57] ABSTRACT

A connector is provided with an optical fibre in an axial through-bore. The bore opens into an enlarged recess at one end of the connector. A solid rod of a non-elastical ductile material is inserted into the recess. An axial force from outside the connector is applied to the rod, thereby expanding the rod radially to fix it in position in the recess. A hole is made in the rod with an accurate concentricity relative to the circumference of the connector. The optical fibre is inserted into the hole in the rod. Finally, a further axial force from outside the connector is applied to the rod for radial expansion thereof resulting in a reduction of the diameter of the hole in the rod and thereby obtaining an accurate concentric fastening of the optical fibre.

3 Claims, 6 Drawing Figures

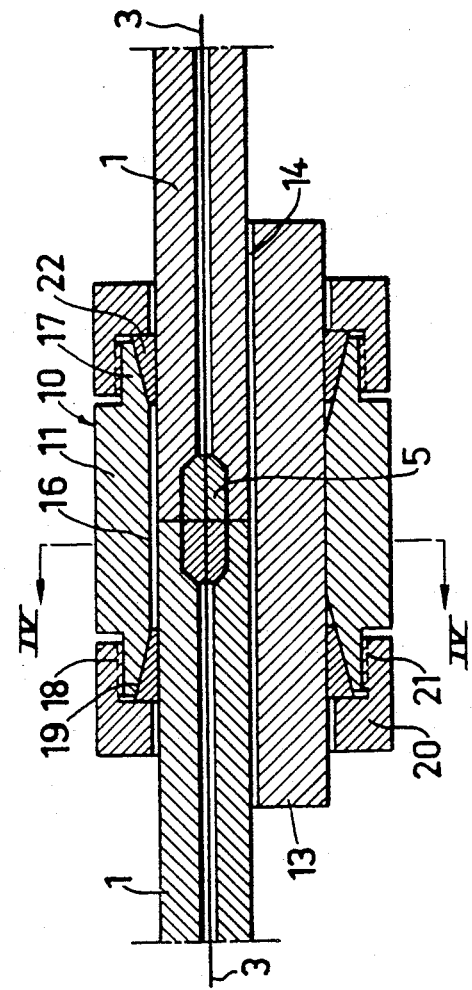
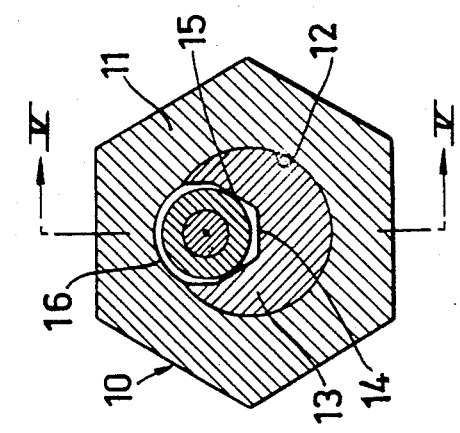

METHOD FOR OBTAINING AN ACCURATE CONCENTRIC FASTENING OF AN OPTICAL FIBRE IN A CONNECTOR

FIELD OF THE INVENTION

The present invention relates to a connector for an optical fibre, which connector is provided with an axial through-hole for the optical fibre and with a bushing for concentric fixing of the fibre within the connector. The bushing is arranged to be compressed in its axial direction by means of a tool in order to obtain a radial deformation resulting in a centering of the optical fibre within the connector.

BACKGROUND OF THE INVENTION

Optical connectors are known in several embodiments, for instance as described in British Pat. No. 1 478 135 and in U.S. Pat. No. 4,190,317. In the connector described in the British Patent the bushing is positioned at a considerable distance inside the mouth of the connector and is compressed axially in order to be expanded radially by means of a piston fixed within the connector by varnish, while the end of the optical fibre is, after the compression of the bushing resulting in the concentric fastening of the fibre, fixed by means of resin in the mouth of the connector. Besides being a relatively complicated construction accuracy is necessarily lost as a result of the spacing of the bushing from the mouth of the connector so that in all probability desired low optical damping can not be achieved. Errors in accuracy are also produced by the method described in said British patent since the free end will wobble during the turning of the surface, so that a different thickness of material is obtained in the bushing. The connector assembly described in said U.S. patent is also a relatively complicated construction. The bushing is tapered in order to hold the fibre after a forced insertion of the bushing into a narrow bore, which according to the preferred embodiment is made in a second bushing arranged in a recess in the mouth of the connector. Due to several details cumulative errors in accuracy are produced resulting in a deteriorated optical damping. During the force insertion of the tapered body there is also a risk of skew setting or "swelling" which also results in deteriorated accuracy.

SUMMARY OF THE INVENTION

The present invention is based on the realization that the concenctric fastening of an optical fibre requires for the decisive optical damping in the connector an accuracy in the order of magnitude of a few micrometers. The fastening should accordingly take place immediately at the mouth of the connector. Moreover, as few means as possible enclosing the fibre should be utilized and the bushing should be made of a non-elastic material in order to keep as close tolerances as possible upon the manufacture of the bore for the fibre. The invention provides an improvement in optical damping compared with previous techniques, and involves a simplified method for obtaining the concentric holding of the optical fibre in the connector. This is achieved by the following steps:

(a) inserting a solid rod (i.e. a rod without a hole therein), fabricated of a non-elastic ductile material e.g. a soft metallic material, into a cylindrical recess in the front end of a connector;

(b) applying, from outside of the connector, an axial force to the rod to expand the rod outwardly in radial direction thereby fixing the rod in position relative to the inner wall of the recess;

(c) forming a hole in the rod with an accurate concentricity relative to the outer surface of the connector;

(d) inserting the optical fibre into said hole in the rod; and (e) applying, from outside of the connector, an axial force to the rod to expand the rod inwardly in radial direction so as to reduce the size of the hole in the rod, thereby obtaining an accurate concentric fastening of the optical fibre.

BRIEF DESCRIPTION OF THE DRAWINGS

FIGS. 4 and 5 show a coupling device for two connectors along the section line IV—IV in FIG. 5 and along the section line V—V in FIG. 4, respectively.

DESCRIPTION OF THE PREFERRED EMBODIMENT

Figure 1:
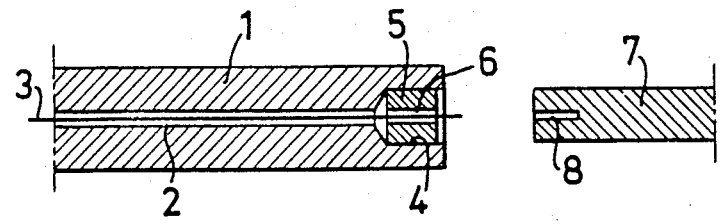
FIGS. 1-3 illustrate schematically different steps for manufacturing an optical fibre connector according to the invention.

The connector 1 shown in FIG. 1 has an axial bore 2 for an optical fibre 3. The bore is enlarged at its forward end or coupling end to provide a recess 4, and a bushing 5 having a hole 6 in alignment with the extension of the bore 2 is inserted into the recess 4. FIG. 1 also shows the front end of a punch 7 having a hole 8 for receiving the optical fibre 3.

Figure 2B:
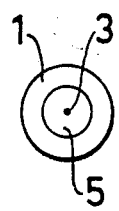
Figure 2A:
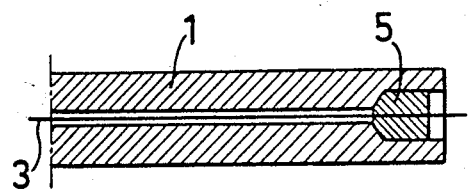
Figure 3:
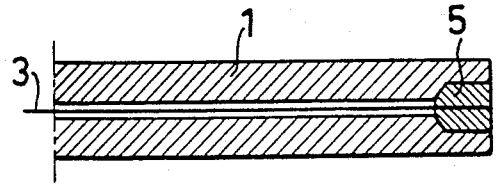

The bushing 5 is made of a soft metallic material, preferably a tin alloy, and the punch 7 is arranged to compress the bushing in its axial direction for obtaining a radial deformation thereof. FIG. 2 illustrates the shape of the connector and bushing after the aforementioned compression step, and FIG. 3 shows the final shape of the connector after grinding the coupling end thereof.

By a method as described above, and using a bushing of a soft metallic material, a non-elastic and maximum accuracy concentric fixing of an optical fibre is made possible. Since the concentricity is determined relative to the outer surface of the connector 1, the bushing 5 is preferably manufactured in the form of a solid rod which is inserted into the recess 4 and fixed therein by a limited compression of the rod by means of a suitable tool applied to the outermost face of the solid rod. Thereafter the axial hole 6 is bored in the rod, the optical fiber is inserted into the hole 6, and a further axial force is applied to the outer face of the rod to further compress the rod radially so as to reduce the diameter of the hole 6 thereby fixing the optical fiber in position relative to the rod, and thereby relative to the connector 1.

Due to the accurate centering of an optical fibre in a connector which is achieved by the foregoing method, the connector can be lined up with another connector in an optical coupling device. An appropriate embodiment of such a coupling device is shown in FIGS. 4 and 5.

The coupling device 10 shown in FIGS. 4 and 5 consists of a middle sleeve 11 having a central through-hole 12, in which a rod 13 is fixed. A longitudinal groove 14 with walls 15 is formed in the rod 13 for obtaining an inwardly decreasing cross-section of the groove. The hole 12 has above the groove 14 a portion 16 which is somewhat enlarged and extends along the groove, said portion 16 being concentrically formed relative to a connector 1 inserted into the groove. The sleeve 11 is provided at its ends with projecting flanges 17 having an external thread 18 and an internal tapered surface 19. The threads 18 are arranged for cooperation with nuts 20 having internal threads 21 and the tapered surfaces 19 are arranged for cooperation with annular tapered wedge elements 22, which preferably have an axial slit.

When coupling two connectors 1 together by means of the coupling device 10 shown in FIGS. 4 and 5, the connectors are inserted from the opposite ends of the groove 14 into abutment with one another as shown in FIG. 5. The nuts 20 are positioned so far outwardly, that a wedge effect does not exist between the wedge elements 22 and the surfaces cooperating with the elements in order to allow the insertion of the connectors. The nuts 20 are thereafter screwed upon the threads 18 and the wedge elements 22 are wedged up between the tapered surfaces 19 of the sleeve 11 and the outer surfaces of the connectors 1 which face the portion 16 and the rod 13.

An extraordinarily rigid coupling of the connectors 1 and a highly accurate alignment of the fibre ends relative each other is obtained by means of the coupling device 10. Moreover, the construction is simple in manufacture and allows a simple and rapid handling.

I claim:

1. The method of fastening an optical fiber to an end face of a connector so that said fiber, so fastened, passes from said end face axially through said connector, comprising the following steps performed in the order stated:

(a) providing an elongated connector which has an axial bore extending therethrough, said bore having a radially enlarged end portion at one end thereof which opens into an end face of said connector, the axial length of said radially enlarged end portion being substantially smaller than the length of said axial bore;

(b) inserting a solid rod of nonelastic ductile material into said radially enlarged end portion of said bore from said end face of said connector, said rod having an outer diameter that is slightly smaller than the inner diameter of said enlarged end portion of said bore;

(c) applying an axial force from the exterior of said end face of said connector to the end of said rod which faces said end face of said connector to deform said inserted rod radially outwardly into firm engagement with the inner walls of said enlarged end portion of said bore thereby to fix said deformed rod in position in said enlarged end portion of said bore;

(d) forming an axial hole in said rod which is in alignment with said axial bore in said connector and in accurate concentricity to the outer surface of said connector, (e) inserting an optical fiber into the axial hole in said rod to extend through said axial hole into and along said axial bore in said connector, (f) applying a further axial force from the exterior of said end face of said connector to the end of said rod which faces the end face of said connector thereby to further deform said rod radially inwardly so as to reduce the diameter of the axial hole in said rod thereby to fixedly attach said optical fiber to said radially deformed rod in accurate concentricity to the outer surface of said connector, and (g) machining said end face of said connector so that said end face of said connector, the end of said deformed rod which faces said end face, and the end of said optical fiber adjacent said end face of said connector all lie in the same plane.

2. The method of claim 1 wherein said rod is fabricated of a soft metallic material.

3. The method of claim 2 wherein said radially enlarged end face of said bore and the initial shape of said rod are each cylindrical in configuration.

* * * * *